United States Patent
Thayer et al.

(10) Patent No.: US 6,643,226 B1
(45) Date of Patent: Nov. 4, 2003

(54) MAIL SLOT DATA CARTRIDGE EXCHANGE SYSTEM FOR USE WITH A DATA STORAGE SYSTEM

(75) Inventors: Nicholas D. Thayer, Greeley, CO (US); Robert W. Luffel, Greeley, CO (US); David P. Jones, Bellvue, CO (US); Mark A. Smith, Holdredge, NE (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 591 days.

(21) Appl. No.: 09/179,793

(22) Filed: Oct. 27, 1998

(51) Int. Cl.[7] ............................................. G11B 17/04
(52) U.S. Cl. ...................... 369/30.48; 360/92; 369/30.49
(58) Field of Search ............................ 369/176, 178, 369/191, 192, 36, 30.43, 30.48, 30.49; 360/92; 312/9.43, 9.52, 9.53, 9.54, 9.55, 9.56, 9.57, 9.63, 107.5, 215–217, 218–222, 319.8, 333, 334.2, 334.34

(56) References Cited

U.S. PATENT DOCUMENTS

| | | | | |
|---|---|---|---|---|
| 1,730,391 A | * | 10/1929 | Stobba | 312/317.3 |
| 2,728,626 A | * | 12/1955 | Gussack | 312/333 |
| 2,739,027 A | * | 3/1956 | Gussack | 312/333 |
| 3,666,337 A | * | 5/1972 | Sztorc | 312/211 |
| 3,700,301 A | * | 10/1972 | Boeck | 312/333 |
| 3,799,638 A | * | 3/1974 | Faiks | 312/216 |
| 4,679,950 A | * | 7/1987 | Delmege et al. | 384/18 |
| 4,837,647 A | | 6/1989 | Nonaka et al. | 360/92 |
| 4,993,784 A | * | 2/1991 | Dana et al. | 312/221 |
| 4,998,232 A | | 3/1991 | Methlie et al. | 369/36 |
| 5,001,582 A | | 3/1991 | Numasaki | 360/98.06 |
| 5,010,536 A | | 4/1991 | Wanger et al. | 369/36 |
| 5,014,255 A | | 5/1991 | Wanger et al. | 369/36 |
| 5,016,946 A | * | 5/1991 | Reznikov et al. | 312/108 |
| 5,036,503 A | | 7/1991 | Tomita | 369/36 |
| 5,040,833 A | * | 8/1991 | Brunnert | 292/80 |
| 5,043,962 A | | 8/1991 | Wanger et al. | 369/36 |
| 5,060,211 A | | 10/1991 | Blanding | 369/36 |
| 5,101,387 A | | 3/1992 | Wanger et al. | 369/36 |
| 5,203,620 A | * | 4/1993 | McLennan | 312/334.46 |
| 5,255,251 A | * | 10/1993 | Fitzgerald et al. | 369/36 |
| 5,337,297 A | | 8/1994 | Kvifte et al. | 369/36 |
| 5,544,146 A | | 8/1996 | Luffel et al. | 369/178 |
| 5,596,556 A | | 1/1997 | Luffel et al. | 369/36 |
| 5,638,349 A | | 6/1997 | Rugg et al. | 369/36 |
| 5,659,440 A | * | 8/1997 | Acosta et al. | 360/92 |
| 5,682,096 A | | 10/1997 | Christie, Jr. et al. | 324/207.2 |
| 5,761,030 A | * | 6/1998 | Roscoe | 361/684 |
| 5,823,643 A | * | 10/1998 | Feldpausch et al. | 312/221 |
| 5,860,717 A | * | 1/1999 | Mizrahi | 312/322 |
| 5,940,354 A | * | 8/1999 | Inoue | 369/35 |
| 5,999,356 A | * | 12/1999 | Dimitri et al. | 360/71 |
| 6,028,733 A | * | 2/2000 | Schmidtke et al. | 360/92 |
| 6,059,389 A | * | 5/2000 | Hsu et al. | 312/330.1 |
| 6,104,693 A | * | 8/2000 | Coffin et al. | 369/178 |

FOREIGN PATENT DOCUMENTS

| | | | |
|---|---|---|---|
| EP | 0866452 A1 | | 9/1998 |
| JP | 405234203 A | * | 7/1993 |
| JP | 405205373 A | * | 8/1993 |
| JP | 05325361 | | 12/1993 |
| NL | 3511161 | * | 10/1985 |
| WO | WO 85/02051 | | 9/1985 |

* cited by examiner

*Primary Examiner*—Brian E. Miller
*Assistant Examiner*—Franklin D. Altman

(57) ABSTRACT

A mail slot data cartridge exchange system for a data storage system may comprise a drawer mounted to the data storage system so that the drawer can be moved between a retracted position and an extended position. A cartridge magazine for holding at least one data cartridge is sized to be removably received by the drawer so that at least a portion of the cartridge magazine is exposed when the drawer is in the extended position. A drawer stop index member is operatively associated with the drawer so that the movement of the drawer stop index member corresponds to movement of the drawer. A lock apparatus mounted to the data storage system is switchable between a locked state and an unlocked state. The lock apparatus engages the drawer stop index member when the lock apparatus is in the locked state and when the drawer is in a regulated extended position.

29 Claims, 7 Drawing Sheets

MAIL SLOT DATA CARTRIDGE EXCHANGE SYSTEM FOR USE WITH A DATA STORAGE SYSTEM

FIELD OF THE INVENTION

This invention relates generally to data storage systems for handling and storing data cartridges, such as optical disk or magnetic tape cartridges, and more specifically to apparatus for removing and replacing data cartridges contained in such data storage systems.

BACKGROUND

Many different types of data storage systems exist and are being used to store data cartridges at known locations and to retrieve desired data cartridges so that data may be written to or read from the data cartridges. Such data storage systems are often referred to as "juke box" data storage systems, particulary if they can accommodate a large number of individual data cartridges.

A typical juke box data storage system may include one or more different types of cartridge receiving devices for holding the various data cartridges. For example, one type of cartridge receiving device may comprise a cartridge storage rack or "magazine" while another type of cartridge receiving device may comprise a cartridge read/write device. The cartridge storage racks or magazines serve to provide storage locations for the data cartridges and are commonly arranged so that they form one or more vertical stacks, although other configurations are possible. The cartridge read/write device may be located at any convenient location within the data storage system. The data storage system may also be provided with a cartridge handling system for transporting the data cartridges between the various cartridge receiving devices, e.g., between the cartridge storage racks and the cartridge read/write devices. A typical cartridge handling system may include a cartridge engaging assembly or "picker" for engaging the various data cartridges contained in the cartridge receiving devices, as well as a positioning device for moving the cartridge engaging assembly among the various cartridge receiving devices.

Data storage systems of the type described above are usually connected to a host computer system (not shown) which may access or store data on the data cartridges. For example, if the host computer system issues a request for data contained on a particular data cartridge, a control system associated with the data storage system actuates the positioning system to move the cartridge engaging assembly or "picker" along the cartridge storage racks until the cartridge engaging assembly is positioned adjacent the desired data cartridge. The cartridge engaging assembly may then remove the data cartridge from the cartridge storage rack and carry it to the cartridge read/write device. Once properly positioned adjacent the cartridge read/write device, the cartridge engaging assembly may insert the selected data cartridge into the cartridge read/write device so that the host computer may thereafter read data from or write data to the data cartridge. After the read/write operation is complete, the cartridge engaging assembly may remove the data cartridge from the cartridge read/write device and return it to the appropriate location in the cartridge storage rack.

It is often necessary or desirable for a system operator to periodically access one or more of the data cartridges contained within such a data storage system. For example, it may be necessary for the system operator to remove certain of the data cartridges from time to time if they become filled with data that is to be archived at another location. The system operator may then replace the filled data cartridges with blank data cartridges. In another situation, the system operator may desire to remove one or more of the data cartridges and replace it or them with a substitute data cartridge or cartridges containing different data.

In order to accommodate the foregoing necessities, many data storage systems are provided with an access panel to allow the system operator to access to the data cartridges stored within the data storage system. While such "panel" type of cartridge exchange systems are usually effective from a functional standpoint, they are usually difficult and cumbersome to implement in practice. For example, since the access panel needs to be removed in order to access the data cartridges, the data storage system must be temporarily shut-down in order to prevent the cartridge handling system from interfering with the system operator's access to the cartridges and to prevent injury to the system operator should the cartridge engaging assembly move while the system operator's hand is inside the data storage system. Another problem is that it is often difficult for the system operator to locate the particular data cartridges that are to be replaced. Still another disadvantage is that once the access panel has been replaced, it is necessary for the data storage system to re-inventory the data storage cartridges contained therein. Such re-inventory processes are time consuming and difficult to justify, particularly if only one cartridge has been replaced. Nevertheless, the data storage system must re-inventory the data cartridges before the data storage system can be returned to service.

Partly in an effort to solve some of the problems associated with the foregoing panel type of data cartridge exchange system, data storage systems have been developed that utilize a "mail slot" to allow a system operator to access the data cartridges stored in the data storage system. Such a mail slot system is useful in that it allows a system operator to access a data cartridge without the need to remove a separate access panel on the data storage system. Consequently, most mail slot type of data cartridge exchange systems eliminate the need to temporarily suspend the operation of the data storage system while the system operator is accessing the data cartridges. Unfortunately, however, most mail slot systems utilize a separate transport mechanism to present the desired data cartridge to the system operator. The separate transport mechanism increases the number of mechanical components and systems associated with the data storage system, thereby adding to the overall cost and complexity of the data storage system. The separate transport mechanism also takes up valuable space within the data storage system which might otherwise be used for the storage of additional data cartridges.

Another disadvantage associated with most currently available mail slot data cartridge exchange systems is that they can only handle one data cartridge at a time, therefore making it difficult and time consuming to replace or exchange more than one data cartridge. While mail slot data cartridge exchange systems do exist that allow a system operator to access more than one data cartridge at a time, they typically involve relatively large transport mechanisms which require a substantial amount of space within the data storage system, space which, again, may otherwise be used for the storage of additional data cartridges.

SUMMARY OF THE INVENTION

A mail slot data cartridge exchange system for a data storage system may comprise a drawer mounted to the data storage system so that the drawer can be moved between a retracted position and an extended position. A cartridge magazine for holding at least one data cartridge is sized to be removably received by the drawer so that at least a portion of the cartridge magazine is exposed when the drawer is in the extended position. A drawer stop index member is operatively associated with the drawer so that the movement of the drawer stop index member corresponds to movement of the drawer. A lock apparatus mounted to the data storage system is switchable between a locked state and an unlocked state. The lock apparatus engages the drawer stop index member when the lock apparatus is in the locked state and when the drawer is in a regulated extended position.

In another embodiment, a mail slot data cartridge exchange system is provided that comprises a drawer sized to receive at least one data cartridge, the drawer being mounted to the data storage system so that the drawer can be moved between a retracted position and an extended position. A drawer stop index member is operatively associated with the drawer so that movement of the drawer stop index member corresponds to movement of the drawer. A lock apparatus mounted to the data storage system is switchable between a locked state and an unlocked state. The lock apparatus engages the drawer stop index member when the lock apparatus is in the locked state and when the drawer is in a regulated extended position.

Also disclosed is a method for accessing at least one data cartridge contained in a data storage system that comprises the steps of providing the data storage system with a drawer sized to receive at least one data cartridge, the drawer being moveable between a retracted position and a plurality of extended positions; providing a drawer extension regulator apparatus for allowing the drawer to be extended to a selected of the plurality of extended positions; extending the drawer from the retracted position; actuating the drawer extension regulator apparatus to stop the extension of the drawer when the drawer has been extended to a selected one of the plurality of extended positions; and returning the drawer to the retracted position without further actuating the drawer extension regulator apparatus.

BRIEF DESCRIPTION OF THE DRAWING

Illustrative and presently preferred embodiments of the invention are shown in the accompanying drawing in which.

DETAILED DESCRIPTION OF THE INVENTION

Figure 1:
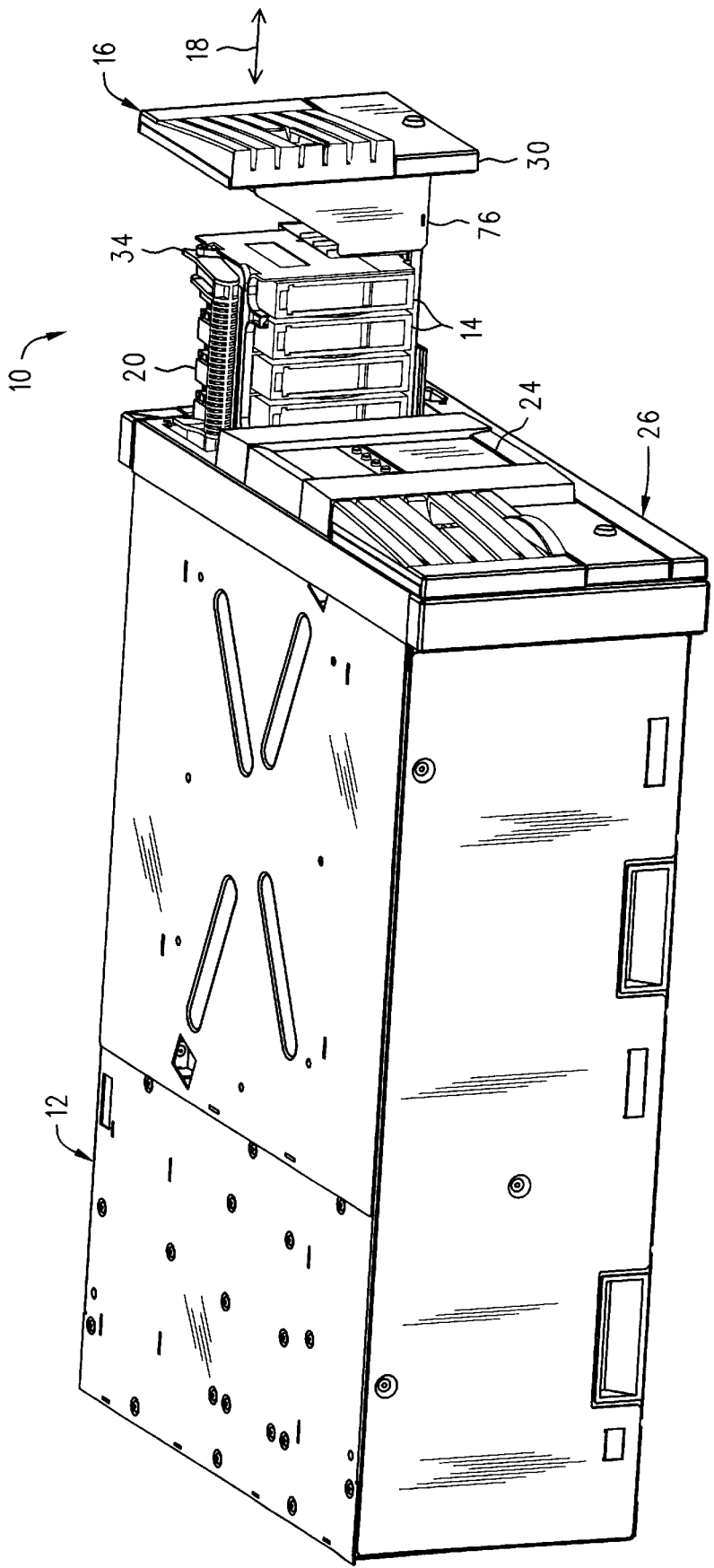
FIG. 1 is a perspective view of a front panel of a data storage system having a mail slot data cartridge exchange system according to the present invention.

A "mail slot" data cartridge exchange system 10 according to one embodiment of the present invention is shown in FIG. 1 as it could be used in conjunction with a data storage system 12 containing one or more data cartridges 14. The mail slot data cartridge exchange system 10 allows at least one data cartridge 14 to be accessed by a system operator (not shown) during the operation of the data storage system 12. For example, the system operator may use the mail slot data cartridge exchange system 10 to withdraw a certain data cartridge 14 and replace it with a substitute data cartridge (not shown). The mail slot data cartridge exchange system 10 thereby provides a convenient way to deposit and withdraw selected data cartridges to and from the data storage system 12.

The mail slot data cartridge exchange system 10 utilized in one preferred embodiment of the present invention may comprise a drawer 16 mounted to the data storage system 12 so that the drawer 16 may be moved between a retracted position (shown in FIGS. 2 and 5) and an extended position (shown in FIG. 1), i.e., generally in the directions indicated by arrows 18. The drawer 16 may be configured to receive one or more data cartridges 14 which, in one preferred embodiment, may be contained within one or more cartridge magazines 20. That is, the drawer 16 may be configured to receive one or more cartridge magazines 20, with each cartridge magazine 20 being configured to receive one or more data cartridges 14. Alternatively, and as will be described in greater detail below, the drawer may be configured to directly accept one or more data cartridges 14 without the need for a separate cartridge magazine 20.

Figure 2:
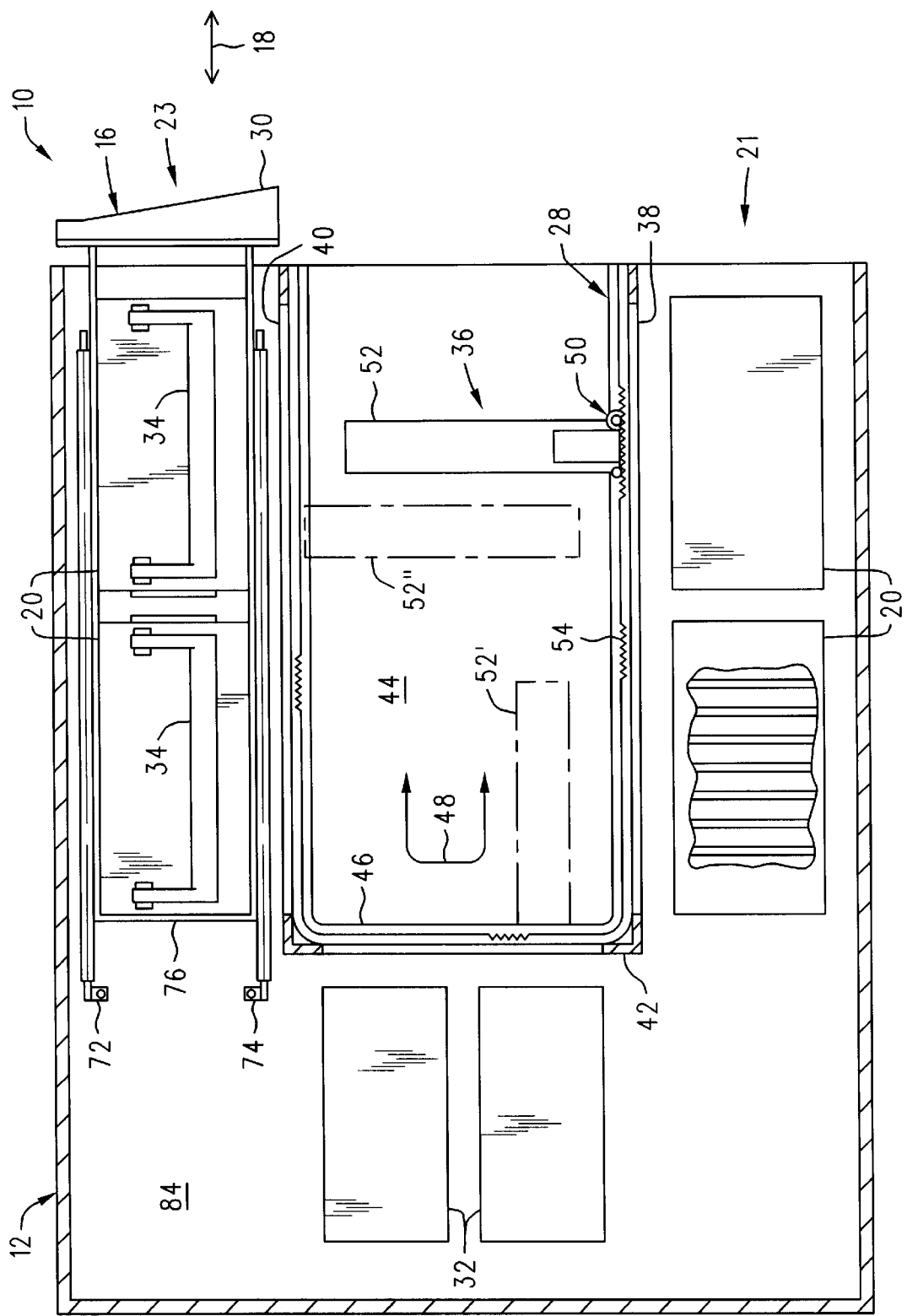
FIG. 2 is a plan view of the data storage system with the front panel removed showing the internal arrangement of the cartridge storage locations and cartridge handling system used to access the data cartridges.

When the drawer 16 is in the extended position (e.g., FIG. 1) a system operator (not shown) may access one or more of the data cartridges 14 carried by the drawer 16. For example, the system operator may desire to remove a desired data cartridge 14 and replace it with a substitute data cartridge (not shown). Alternatively, the system operator may simply remove the desired data cartridge 14 to allow the same to be used in another device or to be placed in long-term archival storage. In any event, once the system operator no longer needs to access the data cartridges carried by the drawer 16, the drawer 16 may be returned to the retracted position (FIG. 2).

The mail slot data cartridge exchange system 10 may also be provided with a drawer extension regulator apparatus 22 (FIGS. 5 and 6) that regulates the location of the extended position of the drawer 16. Therefore, the mail slot data cartridge exchange system 10 allows access to only a selected number of cartridges 14 carried by the drawer 16. In one preferred embodiment, the mail slot data cartridge exchange system 10 may be programmed by means of a control panel 24 provided on the front panel 26 of the data storage system 12. See FIG. 1. If so programmed, the drawer extension regulator apparatus 22 functions to stop the extension of the drawer 16 once the programmed number of data cartridges 14 have been exposed. For example, if the system operator programs the mail slot data cartridge exchange system 10 to allow access to only three (3) data cartridges 14, then the drawer extension regulator apparatus 22 operates to prevent the system operator from further extending the drawer 16 once about three (3) data cartridges 14 have been exposed. This condition is illustrated in FIG. 1. Of course, the mail slot data cartridge exchange system 10 may be programmed to allow either a greater or fewer number of data cartridges 14 to be exposed.

The mail slot data cartridge exchange system 10 may be operated as follows to allow the system operator (not shown) to access the various data cartridges 14 contained within the data storage system 12. Consider, for example, a situation wherein the data storage system 12 has been provided with a plurality of data cartridges 14. Assume also that the system operator has previously programmed the mail slot data cartridge exchange system 10 to allow access to three (3) data cartridges 14. During normal operation, the drawer 16 may remain in the closed or retracted position shown in FIGS. 2 and 5, thereby allowing the cartridge handling system 28 (FIGS. 2 and 3) internal to the data storage system 12 to access all of the data cartridges 14 contained therein. If the need then arises for the system operator to access one or more of the data cartridges 14, such as, for example, to remove the one or more of the data cartridges 14 and replace it or them with a substitute data cartridge or data cartridges (not shown), the system operator may pull on the front panel 30 of the drawer 16, thereby moving the drawer 16 to the extended position. In accordance with the programming of the mail slot data cartridge exchange system 10, the drawer extension regulator apparatus 22 prevents the drawer 16 from being extended further once three (3) data cartridges 14 have been exposed. The system operator may thereafter access the exposed data cartridges 14 for the exchange, removal, or replacement of the same. While the drawer 16 is in the extended position, the data storage system 12 remains operable and the cartridge handling system 28 may continue to access the data storage cartridges 14 stored in a "fixed" cartridge storage array 21 (i.e., those cartridges 14 not carried by the drawer 16). See FIG. 2. However, the cartridge handling system 28 will not access the data cartridges 14 carried by the drawer 16. When the system operator no longer needs access to the exposed data cartridges 14, he or she may push on the front panel 30 of drawer 16, thereby returning the drawer 16 to the retracted position.

After the drawer 16 has been returned to the retracted position, the data storage system 12 may then "re-inventory" the data cartridges 14 stored within the data storage system 12. However, the re-inventory operation need only be performed on those data cartridges 14 that were exposed when the drawer 16 was in the extended position. In the present example, then, the data storage system 12 need only re-inventory the three (3) data cartridges 14 that were exposed, since those were the only data cartridges 14 that could have been exchanged, removed, or replaced by the system operator.

If the mail slot data cartridge exchange system 10 is configured so that the various data cartridges 14 carried by the drawer 16 are contained within one or more cartridge magazines 20, the mail slot data cartridge exchange system 10 may be programmed to allow the drawer 16 to be extended by an amount sufficient to allow an entire cartridge magazine 20 to be removed and replaced. For example, in the embodiment shown and described herein, the drawer 16 is configured to receive two cartridge magazines 20, each of which is configured to receive five (5) data cartridges 14. In this example, then, the entire cartridge magazine 20 may be removed by the system operator, thereby allowing for the convenient exchange, removal, or replacement of the plurality of data cartridges 14 contained within the cartridge magazine 20. The cartridge magazine 20 may be provided with a handle 34 to allow the cartridge magazine 20 to be conveniently carried by the system operator.

It should be noted that any of the data cartridges 14 contained within the data storage system 12 may be accessed via the mail slot data cartridge exchange system 10. For example, data cartridges 14 stored in the magazines 20 that are mounted in the "fixed" cartridge storage array 21 located opposite the drawer 16 may also be accessed by instructing the cartridge handling system 28 to move the selected data cartridges 14 from the "fixed" cartridge storage array 21 (i.e., those cartridge magazines 20 that are not mounted on the drawer 16) to the "mail slot" cartridge storage array 23 (i.e., those cartridge magazines 20 that are exposed when the drawer 16 is moved to the extended position). After the selected data cartridges 14 have been transferred from the fixed cartridge storage array 21 to the mail slot cartridge storage array 23, the system operator may then access the recently transferred data cartridges 14 in the manner already described by simply pulling open the drawer 16 to the extended position.

A significant advantage associated with the mail slot data cartridge exchange system 10 according to the present invention is that it provides easy and convenient access to one or more data cartridges contained within a data storage system, but without the need to open-up the data storage system to manually access the cartridges stored therein. Consequently, the mail slot data cartridge exchange system 10 allows one or more data cartridges to be accessed by the system operator without the need to suspend the operation of the data storage system during those times in which the data cartridges are being accessed. The present invention also dispenses with the need to provide a separate cartridge transport mechanism to present the desired data cartridge to the system operator. The elimination of a separate cartridge transport mechanism reduces the number of mechanical components and devices associated with the data storage system, thereby reducing cost and increasing reliability. Yet another advantage of the present invention is that it allows for more than one data cartridge to be accessed at one time, yet without using valuable storage space within the data storage system which would otherwise be the case if a separate cartridge transport mechanism were used to present to the system operator a plurality of data cartridges.

Still other advantages are associated with the drawer extension regulator apparatus 22. For example, by limiting the amount by which the drawer 16 may be extended, thus the number of data cartridges 14 that may be exposed, the drawer extension regulator apparatus 22 allows the data storage system 12 to re-inventory only those data cartridges that were exposed, thereby eliminating the need to re-inventory all of the data cartridges stored in the data storage system. Limiting the re-inventory process to only those cartridges that could have been accessed by the system operator limits the "downtime" associated with the re-inventory process, thereby allowing for the more efficient operation of the data storage system 12.

Having briefly described the mail slot data cartridge exchange system 10 according to the present invention, as well as some of its more significant features and advantages, the various embodiments of the mail slot data cartridge exchange system will now be described in detail. However, before proceeding with the description, it should be noted that the mail slot data cartridge exchange system 10 according to the present invention may be utilized in any of a wide range of data storage systems now known or that may be developed in the future for storing and accessing one or more data cartridges stored in the system. Accordingly, the present invention should not be regarded as limited to the particular data storage system 12 shown and described herein. It should also be noted that while the mail slot data cartridge exchange system 10 is shown and described herein as it could be used to store and retrieve at least one DLT (digital linear tape) data cartridge 14 having a standard size and configuration, it is not limited to any particular type or style of data cartridge. Indeed, the mail slot data cartridge exchange system 10 according to the present invention could be used with any type of data storage device comprising any type of data storage medium (e.g., magnetic disk or tape, optical disk, etc.). Consequently, the present invention should not be regarded as limited to use with the DLT type of data cartridge 14 shown and described herein.

With the foregoing considerations in mind, one embodiment of a mail slot data cartridge exchange system 10 is shown in FIG. 1 as it may be used in a data storage or "juke box" system 12 of the type used to store and access large amounts of data. The data storage system 12 may be provided with a cartridge handling system 28 (FIG. 2) to transfer data cartridges 14 between one or more cartridge receiving devices, such as one or more cartridge storage magazines 20 and one or more cartridge read/write devices 32. The various cartridge receiving devices (e.g., the cartridge storage magazines 20 and the cartridge read/write devices 32) may be positioned at various locations within the data storage system 12 so that they define a generally U-shaped configuration, as best seen in FIG. 2. Alternatively, other configurations are possible. By way of example, the data storage system 12 utilized in one preferred embodiment may comprise a data storage system of the type shown and described in U.S. patent application Ser. No. 09/045,134, entitled "Multi-Plane Translating Cartridge Handling System" filed on Mar. 20, 1998, and which is incorporated herein by reference for all that it discloses. Alternatively, the mail slot data cartridge exchange system 10 may be utilized in a data storage system of the type shown and described in U.S. Pat. No. 5,596,556, which is also incorporated herein by reference for all that it discloses.

The cartridge handling system 28 utilized in the data storage system 12 also may be of the type shown and described in U.S. patent application Ser. No. 09/045,134, identified above, although other types of cartridge handling systems that are now known or that may be developed in the future and could also be used.

Figure 3:
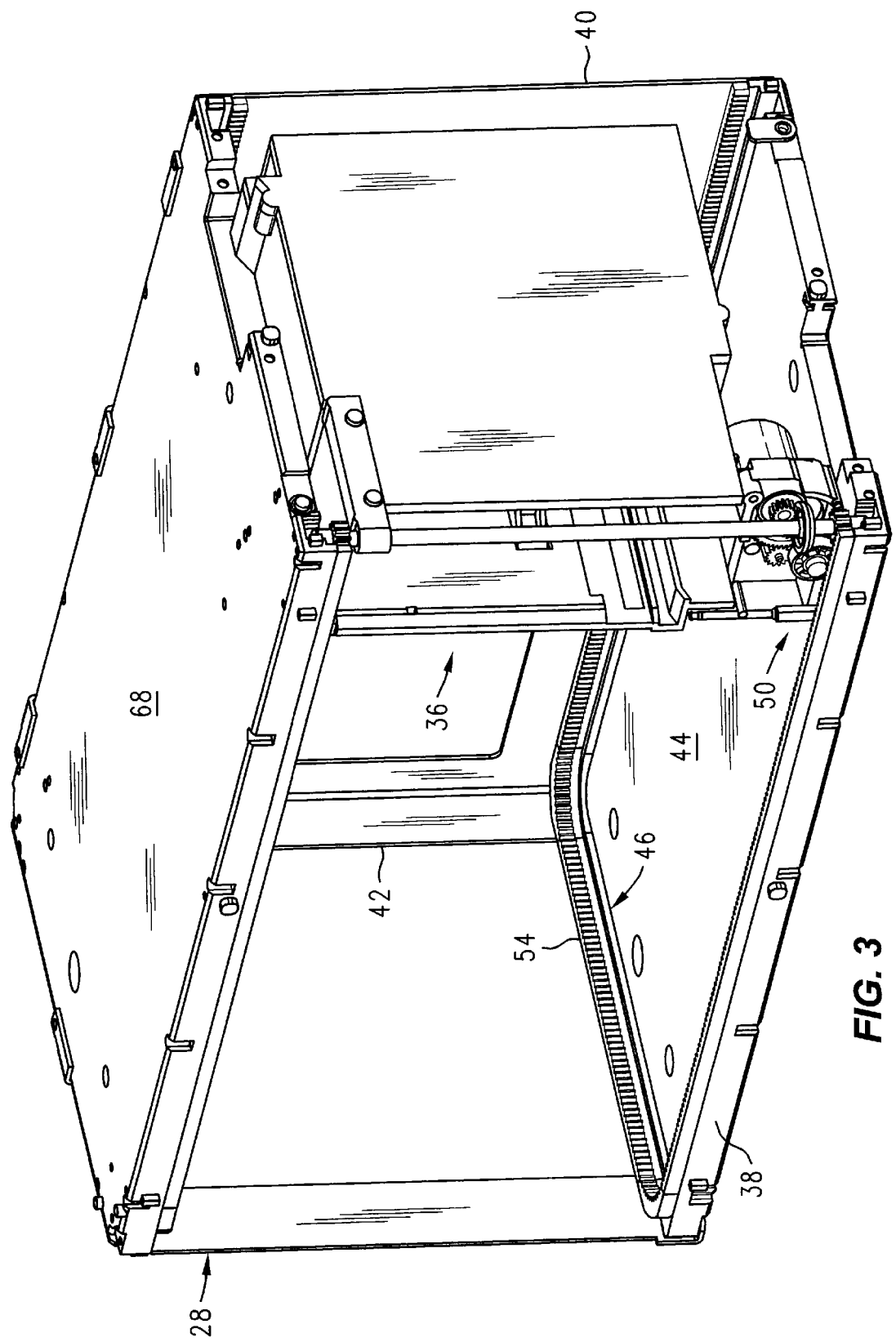
FIG. 3 is a perspective view of the cartridge handling system shown in FIG. 2.

Referring now to FIGS. 2 and 3, the cartridge handling system 28 disclosed in the patent application referred to above and that may be used in one preferred embodiment of the present invention may comprise a generally rectangularly shaped structure having a pair of opposed side portions 38, 40 and an end portion 42. A "fixed" cartridge storage array 21 may be positioned adjacent the first side portion 38 of the cartridge handling system 18. The fixed cartridge storage array 21 may comprise any of a wide range of devices suitable for receiving one or more data cartridges 14. By way of example, in one preferred embodiment, the fixed cartridge storage array 21 may comprise a pair of cartridge magazines 20, each of which is configured to hold a plurality of data cartridges 14.

The drawer 16 may be mounted adjacent the second side portion 40 of the cartridge handling system 28. The drawer 16 may be configured to receive at least one data cartridge 14. By way of example, in one preferred embodiment, the drawer 16 is configured to receive a pair of cartridge magazines 20, each of which may be configured to hold a plurality of data cartridges 14. The drawer 16 and the data cartridges 14 stored therein together define a "mail slot" cartridge storage array 23. A pair of cartridge read/write devices 32 may be positioned adjacent the end portion 42 of the cartridge handling system 28 in the manner best seen in FIG. 2.

Referring now to FIGS. 2 and 3, the cartridge handling system 28 may comprise a lower plate 44 having U-shaped guide member or channel 46 therein which guides a cartridge engaging device or "picker" 36 along a generally U-shaped path 48 so that the cartridge engaging device or picker 36 may access the data cartridges 14 contained in the various cartridge storage magazines 20 and the cartridge read/write devices 32. The cartridge engaging device 36 may be moved along the U-shaped guide member or channel 46 by an actuator system 50. For example, the actuator system 50 may move the cartridge engaging device 36 between a first position 52 adjacent the fixed cartridge storage array 21, a second position 52' adjacent the cartridge read/write devices 32, and a third position 52" adjacent the mail slot cartridge storage array 23, i.e., along the generally U-shaped path 48.

Figure 4:
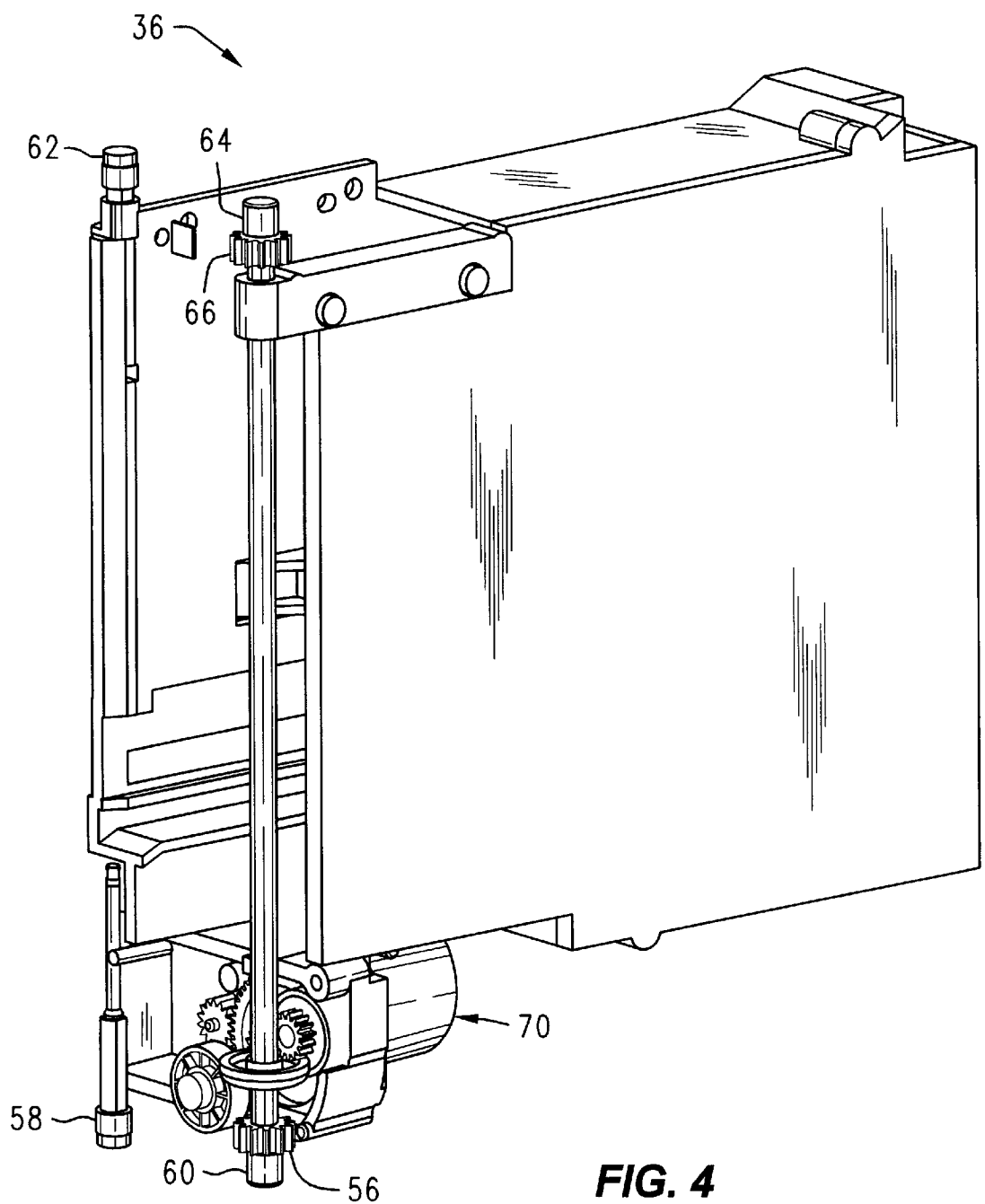
FIG. 4 is a perspective view of a cartridge engaging assembly that may be used in the cartridge handling system shown in FIG. 3.

The cartridge engaging device or "picker" 36 is best seen in FIG. 4 and may comprise apparatus suitable for loading and retrieving the data cartridges 14 to and from the particular cartridge receiving device (e.g., the cartridge magazine 20 or cartridge read/write device 32) in which the data cartridge 14 is held. An example of a cartridge engaging device or "picker" 36 suitable for use in the present invention is shown and described in U.S. patent application Ser. No. 09/045,558, entitled "Cartridge Engaging Assembly with Rack Drive Thumb Actuator System," filed on Mar. 20, 1998, which is incorporated herein by reference for all that it discloses. Alternatively, other cartridge engaging assemblies suitable for use in the present invention are disclosed in the following U.S. patents which are specifically incorporated by reference herein for all that they disclose: U.S. Pat. No. 4,998,232 entitled "Optical Disk Handling Apparatus with Flip Latch;" U.S. Pat. No. 5,010,536 entitled "Cartridge Handling System;" U.S. Pat. No. 5,014,255 entitled "Optical Disk Cartridge Handling Apparatus with Passive Cartridge Engagement Assembly;" and U.S. Pat. No. 5,043,962 entitled "Cartridge Handling System." Since such cartridge engaging devices or "pickers" are well-known in the art and since the details of such devices are not necessary to understand or practice the present invention, the particular cartridge engaging device utilized in one preferred embodiment of the present invention will not be described in further detail herein.

Referring now primarily to FIGS. 3 and 4, the actuator system 50 used to move the cartridge engaging assembly 36 may comprise a rack and pinion drive system having a U-shaped gear rack 54 mounted adjacent the U-shaped guide member or channel 46 in the lower plate 44. A lower pinion gear 56 may be mounted to the cartridge engaging assembly 36 so that it engages the U-shaped gear rack 54. A pair of lower bearing members 58, 60 mounted to the cartridge engaging assembly 36 are configured to be received by the U-shaped guide member or slot 46. The cartridge engaging assembly 36 may also be provided with a pair of upper bearing members 62, 64 and an upper pinion gear 66 which engage an upper U-shaped guide member (not shown) and an upper U-shaped gear rack (not shown) provided on an upper plate 68 associated with the cartridge handling system 28. A drive pinion actuator system 70 is used to drive the lower and upper pinion gears 56 and 66 and move the cartridge engaging assembly 36 along the U-shaped path 48.

The foregoing description of the data storage system 12 and cartridge handling system 28 is provided in order to better understand one environment in which the mail slot data cartridge exchange system 10 according to the present invention may be used. However, it should be understood that the mail slot data cartridge exchange system 10 may be used in any of a wide range of other types of data storage systems and in conjunction with any of a wide range of cartridge positioning systems now known or that may be developed in the future. Consequently, the present invention should not be regarded as limited to the particular data storage system 12 and cartridge handling system 28 shown and described herein. Also, since detailed descriptions of the data storage system 12 and cartridge handling system 28 are not required to understand or practice the mail slot data cartridge exchange system 10 according to the present invention, the particular data storage system 12 and cartridge handling system 28 that may be used in conjunction with the mail slot data cartridge exchange system 10 will not be described in further detail herein.

Figure 5:
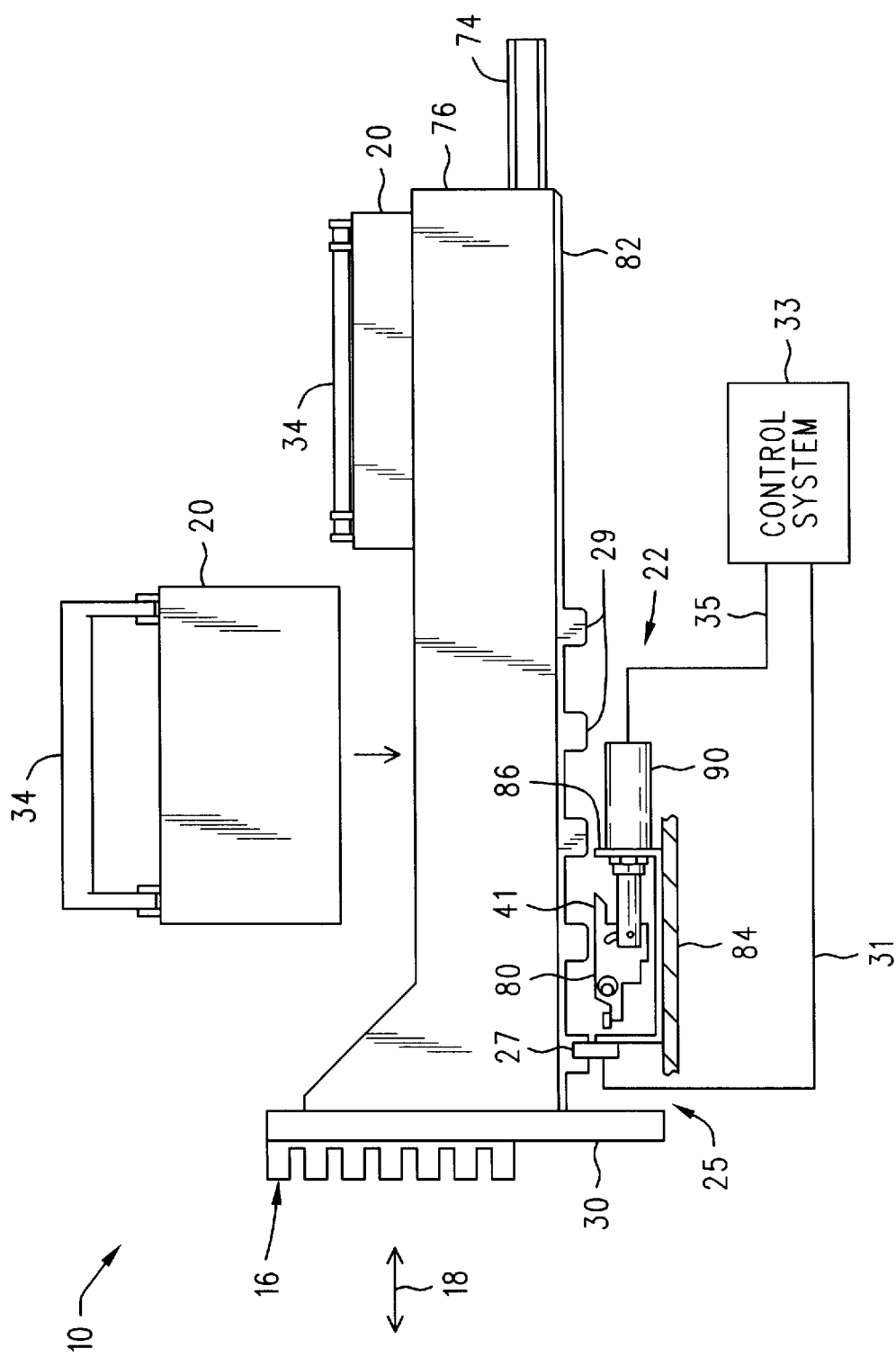
FIG. 5 is a side view in elevation of the mail slot drawer and drawer extension regulator apparatus.
Figure 6:
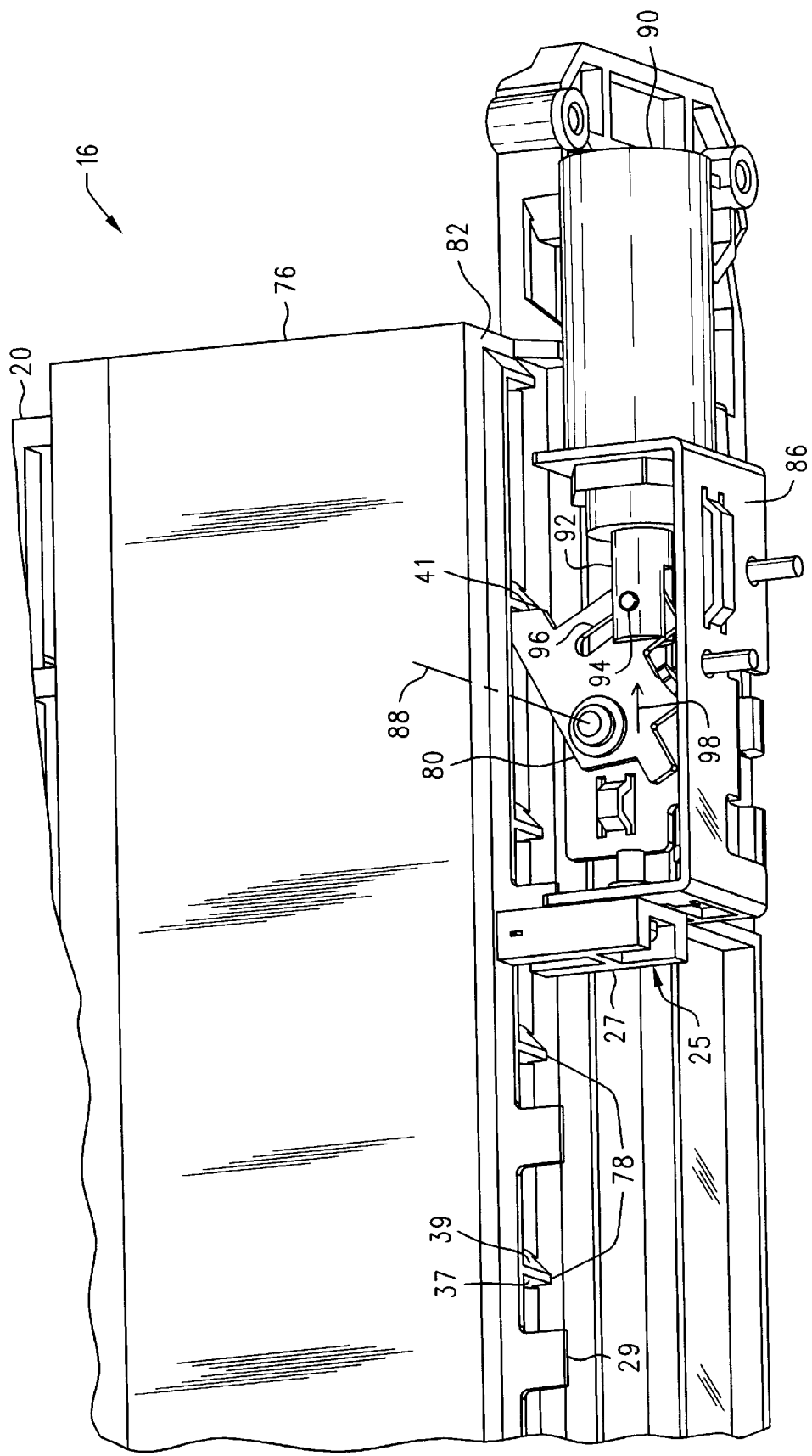
FIG. 6 is an enlarged perspective view of the mail slot drawer and drawer extension regulator apparatus.

The details of the mail slot data cartridge exchange system 10 according to one preferred embodiment of the present invention are best seen in FIGS. 1, 5, and 6. Essentially, the mail slot data cartridge exchange system 10 comprises a drawer 16 having an elongate frame portion 76 that is sized to receive at least one data cartridge 14 in the manner that will be described in greater detail below. The drawer 16 may be mounted to the data storage system 12 so that the drawer 16 can be moved between a retracted position (illustrated in FIGS. 2 and 5) and an extended position (illustrated in FIG. 1). That is, the drawer 16 is mounted so that it may be moved generally in the directions indicated by arrows 18. In one preferred embodiment, the drawer 16 is slidably mounted to the data storage system 12 by a pair of drawer slides 72, 74 which may be mounted to the frame 76 of drawer 16 and to the chassis 84 of the data storage system 12. The drawer slides 72 and 74 may comprise any of a wide range sliding members of the type which are well-known in the art and readily commercially available. Alternatively, the drawer slides 72 and 74 may comprise custom-designed members suitable for the intended application. Other types of mounting systems and devices also may be used provided they allow the drawer 16 to be moved between the retracted and extended positions in the manner already described.

A front panel member or bezel 30 may be attached to the frame member 76 of drawer 16. Front panel member or bezel 30 forms a part of the front panel or bezel 26 of the data storage system 12 when the drawer 16 is in the retracted position. See FIG. 1. Front panel member 30 also provides a convenient means to allow the system operator to pull-open the drawer 16.

The drawer 16 and various components thereof (e.g., frame member 76 and front panel member 30) may be made from any of a wide range of materials (such as metals or plastics) suitable for the intended application. By way of example, in one preferred embodiment, the frame member 76 of drawer 16 is fabricated from sheet metal, although other materials may also be used. The front panel member 30 may comprise a molded plastic material.

As was briefly mentioned above, the drawer 16 may be configured to receive one or more data cartridges 14. The arrangement is such that the drawer 16 comprises a mail slot cartridge storage array 23 (FIG. 2) which forms a part of the "regular" cartridge storage array of the data storage system 12 when the drawer 16 is in the retracted position. As used herein, the term "regular cartridge storage array" refers to both the fixed cartridge storage array 21 and the mail slot cartridge storage array 23. Put in other words, the drawer 16 comprises a cartridge receiving device that is accessible to the cartridge handling system 36 so that the data cartridges 14 carried thereby may be accessed by the cartridge handling system 36 during the normal or regular course of operation of the data storage system 12.

In accordance with the foregoing attributes, then, the frame member 76 of drawer 16 utilized in one preferred embodiment of the invention may be configured to removably receive two (2) cartridge magazines 20 in the manner best seen in FIGS. 2 and 5. Each cartridge magazine 20 in turn may be configured to receive five (5) data cartridges 14, although magazines configured to hold a greater or fewer number of data cartridges may also be used. In one preferred embodiment, the cartridge magazines 20 carried by the drawer 16 are identical to the cartridge magazines 20 comprising the fixed cartridge storage array 21, although this is not necessary. Accordingly, the cartridge magazines 20 received by the drawer 16 comprise the cartridge receiving device that is accessible to the cartridge handling system 36 during the normal or regular course of operation of the data storage system 12. In another embodiment, the drawer 16 could be configured to directly receive one or more data cartridges 14 (i.e., without the need for a separate cartridge magazine 20). In still another configuration, the drawer 16 could comprise a hybrid arrangement, with certain areas of the drawer 16 being configured to directly receive individual data cartridges 14 and with other areas of the drawer 16 being sized to receive a cartridge magazine or magazines (e.g., cartridge magazine 20).

Regardless of the particular configuration of the drawer 16, the drawer 16 may be provided with a drawer extension regulator apparatus 22 to regulate the location of the extended position of the drawer 16, thus the number of data cartridges 14 exposed when the drawer 16 is moved to the extended position. Referring now to FIGS. 5 and 6 simultaneously, the drawer extension regulator apparatus 22 may comprise at least one drawer stop index member 78 associated with the drawer 16 so that the drawer stop index member 78 moves with the drawer 16. The drawer extension regulator apparatus 22 may also comprise a lock member 80 for engaging the drawer stop index member 78, thereby preventing the further extension of the drawer 16.

In one embodiment, the drawer stop index members 78 comprise a plurality of generally triangularly shaped members that may be affixed to the bottom side 82 of drawer 16 in spaced-apart relation, as best seen in FIG. 6. Each drawer stop index member 78 is provided with a lock face 37 and a cam face 39. As will be described in greater detail below, the lock face 37 is configured to engage the pawl 41 of lock member 80, whereas the cam face 39 is configured to displace the lock member 80 from the locked position toward the unlocked position as the drawer 16 is returned to the retracted position. See FIG. 7.

Each drawer stop index member 78 corresponds to a specific extension location of the drawer 16, thereby allowing different numbers of data cartridges to be exposed when the drawer 16 is moved to the extended position. Consequently, the drawer 16 may be provided with any convenient number of drawer stop index members 78 depending on the number of cartridges carried by the drawer 16 as well as on the number of discrete drawer extension positions that are to be provided in a specific application. In accordance with the foregoing, then, the present invention should not be regarded as limited to a drawer 16 having any particular number of drawer stop index members 78. By way of example, in one preferred embodiment, the drawer 16 may be provided with five (5) separate drawer stop index members 78 which correspond to five (5) discrete drawer extension positions.

The drawer stop index members 78 may be fabricated from any of a wide range of materials (e.g., metals or plastics) suitable for the intended application. In one preferred embodiment, the drawer stop index members 78 comprise integral portions of the frame portion 76 of drawer 16. Alternatively, the drawer stop index members 78 may comprise separate components which may be attached to the frame portion 76 of drawer 16 at the appropriate locations.

The lock member 80 may be mounted to a frame member 86 which in turn may be mounted to the chassis 84 of the data storage system 12, as best seen in FIG. 5. The mounting arrangement is such that a pawl 41 provided on the lock member 80 may engage and disengage the lock faces 37 of the various drawer stop index members 37. In one preferred embodiment, the lock member 80 is pivotally mounted to the frame member 86 so that the lock member 80 is free to pivot about axis 88. The pivotal mounting arrangement allows the lock member 80 to be moved between a locked position (shown in FIG. 6) and an unlocked position (shown in FIG. 5) so that the pawl 41 provided thereon may engage and disengage the lock faces 37 of the drawer stop index members 78. The lock member 80 may be provided with a suitable biasing device, such as a spring (not shown) to bias the lock member 80 in the unlocked position.

The lock member 80 and frame member 86 may be fabricated from any of a wide range of materials suitable for the intended application. By way of example, in one preferred embodiment, the lock member 80 is fabricated from sheet metal, although other materials could also be used. Similarly, the frame member 86 also may be fabricated from sheet metal, although other materials could be used.

A linear actuator 90 may also be mounted to the frame member 86 and is used to pivot the lock member 80 about axis 88 to move the lock member 80 from the unlocked position to the locked position. By way of example, in one preferred embodiment, the linear actuator 90 may be provided with an output rod 92 having a transverse pin 94 therein which engages a slot 96 provided in the lock member 80. When the actuator 90 is energized, the actuator 90 moves the rod 92 in the direction indicated by arrow 98 to move the lock member from the unlocked position to the locked position. When the actuator 90 is de-energized, the spring (not shown) returns the lock member 80 to the unlocked position.

Figure 7:
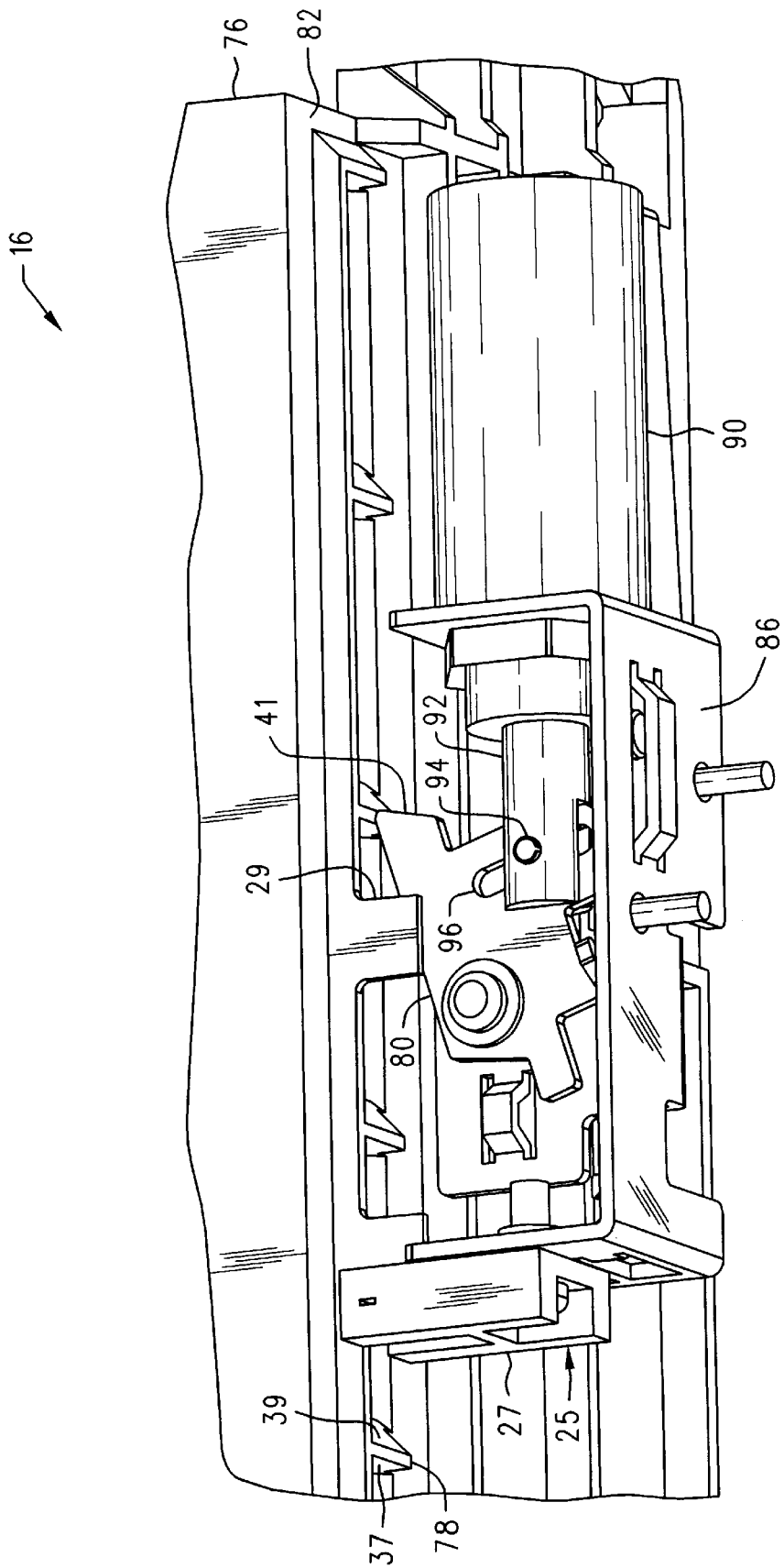
FIG. 7 is an enlarged perspective view of the mail slot drawer and drawer extension regulator apparatus showing the displacement of the lock member by the cam face on a drawer stop index member.

The slot 96 in lock member 80 allows the lock member 80 to move to the unlocked position without displacing the output rod 92 of the actuator 90, as best seen in FIG. 7. The arrangement therefore allows the system operator to return the drawer 16 to the retracted position even though the actuator 90 may be positioned so as to hold the lock member 80 in the locked position. That is, as the drawer 16 is moved to the retracted position, the cam faces 39 of the drawer stop index members 78 act against the pawl 41 of lock member 80 causing the lock member 80 to pivot toward the unlocked position thereby allowing the drawer 16 to close.

The linear actuator 90 may comprise any of a wide range of linear actuators well-known in the art that would be suitable for the intended application. By way of example, in one preferred embodiment, the linear actuator 90 comprises an electric solenoid actuator. Alternatively, of course, other types of actuators, such as pneumatic actuators, could also be used.

The drawer extension regulator apparatus 22 may also be provided with a drawer position sensor apparatus 25 for sensing a position of the drawer 16 with respect to the frame assembly 86 of the drawer extension regulator apparatus 22, thus the chassis 84 of the data storage device 12. See FIG. 5. In one preferred embodiment, the drawer position sensor apparatus 25 may comprise a sensor 27 and a plurality of index flags 29. The sensor 27 may be mounted to the frame assembly 86 of the drawer extension regulator apparatus 22. The index flags 29 may be associated with the drawer 16 so that the index flags 29 move with the drawer 16. The sensor 27 detects the presence of an index flag 29 and produces an output signal 31 related thereto. However, since the sensor 27 is located a spaced distance from the pawl 41 of the lock member 80, each index flag 29 is displaced from its corresponding drawer stop index member 78 by a like distance, as best seen in FIG. 6.

As was the case for the drawer stop index members 78, the drawer extension regulator apparatus 22 may be provided with any number of index flags 29 depending on the number of drawer stop index members 78 that are to be provided. Consequently, the present invention should not be regarded as limited to any particular number of index flags 29. However, it should be noted that in one embodiment, the number of index flags 29 provided is equal to one less than the total number of drawer stop index members 78. That is, in the embodiment that utilizes five (5) separate drawer stop index members 78, the drawer 16 is provided with only four (4) index flags 29. The first index flag 29 corresponds to the second (not the first) drawer stop index member 78, the second index flag 29 to the third drawer stop index member 78, and so on. There is no index flag that corresponds to the first drawer stop index member 78. As will be explained in greater detail below, no index flag is required for the first drawer stop index member 78 since the control system 33 operates the lock member 80 to automatically engage the first drawer stop index member 78 if the system is programmed to terminate the drawer extension at the first position.

The sensor 27 used to detect the index flags 29 may comprise any of a wide range of optical sensors that are well-known in the art and which are readily commercially available. Alternatively, other types of sensors, such as non-optical sensors, may also be used, as would be obvious to persons having ordinary skill in the art after having become familiar with the teachings of the present invention. Consequently, the present invention should not be regarded as limited to any particular type or style of sensor 27. By way of example, in one preferred embodiment, the sensor 27 may comprise an optical sensor model no. HOA6335-2 available from Honeywell, Inc., of Freeport, Ill.

The index flags 29 may be fabricated from any of a wide range of materials (e.g., metals or plastics) suitable for the intended application. In one preferred embodiment, the index flags 29 comprise integral portions of the frame portion 76 of drawer 16. Alternatively, the index flags 29 may comprise separate components which may then be attached to the frame portion 76 of drawer 16 at the appropriate locations.

The drawer extension regulator apparatus 22 may also be provided with a control system 33 to control the operation of the actuator 90. Essentially, the control system 33 may be connected to the sensor 27 and to the linear actuator 90. The control system 33 may also be connected to the control system (not shown) associated with the data storage system 12. The control system 33 is responsive to the output signal 31 provided by the sensor 27 and produces an actuator signal 35 suitable for operating the actuator 90. The control system 33 is also responsive to the programming instructions provided by the system operator as to the desired number of data cartridges 14 that are to be exposed by the mail slot data cartridge exchange system 10. Normally, such programming instructions will be provided to the control system (not shown) associated with the data storage system 12, thereby requiring that the control system 33 be connected to the control system (not shown) associated with the data storage system 12. Alternatively, the programming instructions could be provided directly to the control system 33. In accordance with the foregoing considerations, then, the present invention should not be regarded as limited to the particular control system architecture shown and described herein.

In one preferred embodiment, the actuator signal 35 produced by the control system 33 may comprise a signal that may exist in one of three states: A "de-energized" state; an "energized" state; and a "hold" state. In the "de-energized" state, the actuator signal 35 comprises a substantially zero (0) volt d.c. signal which essentially de-energizes the actuator 90. When the actuator 90 is de-energized the spring (not shown) associated with the lock member 80 moves (if necessary) and holds the lock member 80 in the unlocked position. In the "energized" state, the actuator signal comprises a 12 volt d.c. signal which energizes the actuator 90. The energized actuator 90 moves the rod 92 in the direction of arrow 98 which moves the lock member 80 from the unlocked position to the locked position. Once in the lock member 80 is in the locked position, the control system 33 may switch the actuator signal 35 to the "hold" state, which is sufficient to overcome the spring force and hold the lock member 80 in the locked position. In the embodiment shown and described herein, the "hold" state comprises a 3 volt d.c. signal.

The control system 33 may comprise any of a wide range of systems and circuits suitable for operating the sensor 27, for receiving the output signal 31 produced by the sensor 27, and for producing an actuator signal 35 suitable for operating the actuator 90 in the manner described above. However, since the circuits and systems required for the control system 33 will generally depend on the particular type of sensor 27 and actuator 90 that are to be utilized in the desired application, and in any event could be readily provided by persons having ordinary skill in the art after having become familiar with the teachings of the present invention, the particular control system 33 used to control the drawer extension regulator apparatus 22 will not be described in further detail herein.

The system operator may program the mail slot data cartridge exchange system 10 to allow access to only a limited number of cartridges 14 carried by the drawer 16. In the embodiment shown and described herein, the mail slot data cartridge exchange system 10 may be programmed by means of the control panel 24 which may be provided on the front panel 26 of the data storage system 12. See FIG. 1. When so programmed, the drawer extension regulator apparatus 22 operates to stop the extension of the drawer 16 once the programmed number of data cartridges 14 have been exposed. For example, if the system operator programs the mail slot data cartridge exchange system 10 to allow access to only three (3) data cartridges 14, the drawer extension regulator apparatus 22 prevents the system operator from further extending the drawer 16 once three (3) data cartridges 14 have been exposed. Actually, in one preferred embodiment, the drawer extension regulator apparatus 22 allows the drawer 16 to be extended by an amount sufficient to fully expose three (3) data cartridges 14 plus part of a fourth data cartridge 14. This condition is illustrated in FIG. 1. The exposure of slightly more than three (3) data cartridges 14 allows the system operator (not shown) to more easily access the three (3) exposed data cartridges 14 without interference from the front panel 26. Of course, the mail slot data cartridge exchange system 10 may be programmed to allow either a greater or fewer number of data cartridges 14 to be exposed.

The drawer extension regulator apparatus 22 operates as follows to stop the extension of the drawer 16 once the programmed number of data cartridges 14 have been exposed. Consider, for example, the situation described above wherein the system operator has programmed the mail slot data cartridge exchange system 10 to allow access to only three (3) data cartridges. After the system operator has completed the programming operation, the control system 33 operates the actuator 90 so that the lock member 80 is in the unlocked position. That is, the control system 33 places the actuator signal 35 in the "de-energized" state. When the system operator begins pulling the drawer 16 to the extended position, the various index flags 29 mounted to the bottom surface 82 of drawer frame 76 are detected by the sensor 27. The control system 33 keeps track of the number of index flags 29 passing the optical sensor 27 and operates the actuator 90 (i.e., places the actuator signal 35 in the "energized" state) as soon as the index flag 29 is detected that corresponds to the programmed extension position. The energized actuator 90 moves the lock member 80 to the locked position which thereafter engages the index member 78 that corresponds to the programmed extension position. The engagement of the lock member 80 with the index member 78 prevents the drawer 16 from being withdrawn further. The control system 33 may thereafter place the actuator signal 35 in the "hold" state to hold the lock member 80 in the locked position.

As was described above, the engagement provided by the drawer extension regulator apparatus 22 is "one-way." That is, while the drawer extension regulator apparatus 22 prevents the drawer 16 from being extended beyond the programmed position, the regulator apparatus 22 does not prevent the drawer 16 from being returned to the retracted position. Accordingly, a system operator may move an extended drawer 16 to the retracted position at any time by simply pushing on the drawer 16. The cam surface 39 of each index member 78 located outboard of the lock member 80 contacts the pawl 41 of the lock member 80, thereby deflecting the lock member 80 toward the unlocked position. See FIG. 7. Once the pawl 41 has cleared the cam surface 39 the spring (not shown) returns the lock member 80 to the locked position, thereby preventing the drawer 16 from being extended beyond the position of the of the index member 78 that most recently deflected the pawl 41. After the drawer has been fully closed (i.e., moved to the retracted position), an end limit switch (not shown) may re-set the control system 33 which may then place the actuator signal 35 in the "de-energized" state to de-energize the actuator 90 and allow the spring (not shown) to move the lock member 80 to the unlocked position.

The drawer extension regulator apparatus 22 may be operated according to a slightly different control "schedule" if the operator elects to have the drawer 16 extend only to the first position. After the system operator programs the control system to allow the drawer 16 to be extended only to the first position, the control system 33 immediately places the actuator signal 35 in the energized state. The actuator 90 then moves the lock member 80 to the locked position. Thereafter, the control system 33 may place the actuator signal 35 in the "hold" state to cause the actuator 90 to hold the lock member 80 in the locked position. When the system operator opens the drawer 16, the lock member 80 engages the first drawer stop index member 78, thereby preventing the drawer 16 from being extended beyond the first position. This mode of operation does not require the sensor 27 to first sense an index flag 29, thereby allowing the number of index flags 29 provided to be one fewer than the total number of drawer stop index members 78.

The mail slot data cartridge exchange system 10 may be operated as follows to allow the system operator (not shown) to access the various data cartridges 14 contained within the data storage system 12. Consider, for example, the situation wherein the data storage system 12 has been provided with a plurality of data cartridges 14 and the system operator has programmed the mail slot data cartridge exchange system 10 to allow access to only three (3) data cartridges 14. During normal operation, drawer 16 may remain in the retracted position shown in FIG. 2. So configured, the cartridge handling system 28 (FIGS. 2 and 3) internal to the data storage system 12 may access all of the data cartridges 14 contained in the data storage system 12. If the need arises for the system operator to access one or more of the data cartridges 14 (e.g., to remove a data cartridge 14 and replace it with a substitute data cartridge), the system operator may pull on the front panel 30 of the drawer 16, thereby moving the drawer 16 to the extended position. In accordance with the prior programming of the mail slot data cartridge exchange system 10, the drawer extension regulator apparatus 22 prevents the further extension of the drawer 16 once three (3) data cartridges 14 have been fully exposed by operating the actuator 90 to move the lock member 80 to the locked position as soon as the detector 27 detects the index flag 29 that corresponds to the appropriate drawer stop index member 78. The system operator may thereafter access the exposed data cartridges 14 as necessary. While the drawer 16 is in the extended position, the data storage system 12 remains operable and may continue to access the data storage cartridges 14 contained in the "fixed" cartridge storage array 21. The data storage system 12 will not access the data cartridges 14 contained on the drawer 16. When the system operator no longer needs access to the exposed data cartridges 14, he or she may push on the front panel 30 of drawer 16, thereby returning the drawer 16 to the retracted position.

After the drawer 16 has been returned to the retracted position, the data storage system 12 may "re-inventory" the data cartridges 14 stored within the system. The re-inventory operation need only be performed on those data cartridges 14 that were exposed when the drawer 16 was in the extended position. In the present example, then, the data storage system 12 need only re-inventory the three (3) data cartridges 14 that were exposed, since those were the only data cartridges 14 that could have been changed.

If the mail slot data cartridge exchange system 10 is configured so that the various data cartridges 14 are contained within a cartridge magazine 20, then the mail slot data cartridge exchange system 10 may be programmed to allow the drawer 16 to be extended by an amount sufficient to allow an entire cartridge magazine 20 to be removed and replaced, thereby allowing for the convenient replacement of a plurality of data cartridges 14. The cartridge magazine 20 may be provided with a handle 34 to allow the cartridge magazine 20 to be conveniently carried by the system operator.

It should be noted that any of the data cartridges 14 contained within the data storage system 12 may be accessed via the mail slot data cartridge exchange system 10. For example, data cartridges 14 stored in the magazines 20 comprising the "fixed" cartridge storage array 21 may be accessed by instructing the data storage system 12 to move the selected data cartridges 14 from the magazines 20 comprising the "fixed" cartridge storage array 21 to the magazines 20 comprising the "mail slot" cartridge storage array 23. After the data cartridges 14 have been transferred, the system operator may access the recently transferred data cartridges 14 by simply opening the drawer 16 to the extended position in the manner already described.

It is contemplated that the inventive concepts herein described may be variously otherwise embodied and it is intended that the appended claims be construed to include alternative embodiments of the invention except insofar as limited by the prior art.

What is claimed is:

1. A mail slot data cartridge exchange system for a data storage system, comprising
   a drawer mounted to the data storage system so that said drawer can be moved between a retracted position and an extended position;
   a cartridge magazine for holding at least one data cartridge, said cartridge magazine being sized to be removably received by said drawer, at least a portion of said cartridge magazine being exposed when said drawer is in the extended position to allow a system operator to access said cartridge magazine when said drawer is in the extended position;
   a drawer stop index member operatively associated with said drawer so that movement of said drawer stop index member corresponds to movement of said drawer; and
   lock apparatus mounted to said data storage system, said lock apparatus being switchable between a locked state and an unlocked state, said lock apparatus engaging said drawer stop index member when said lock apparatus is in the locked state and when said drawer is in a regulated extended position, said regulated extended position corresponding to a position of said drawer stop index member.

2. The mail slot data cartridge exchange system of claim 1, wherein said drawer stop index member is mounted to said drawer.

3. The mail slot data cartridge exchange system of claim 1, further comprising a lock actuator operatively associated with said lock apparatus for moving said lock apparatus between the locked state and the unlocked state.

4. The mail slot data cartridge exchange system of claim 3, further comprising a drawer position sensing apparatus for sensing a position of said drawer and for producing a drawer position signal related thereto, said drawer position signal being used to control said lock actuator.

5. The mail slot data cartridge exchange system of claim 4, wherein said drawer position sensing apparatus comprises:
   an index flag operatively associated with said drawer so that movement of said index flag corresponds to movement of said drawer; and
   a sensor mounted to said data storage system, said sensor being responsive to said index flag.

6. The mail slot data cartridge exchange system of claim 5, wherein said index flag is mounted to said drawer.

7. The mail slot data cartridge exchange system of claim 6, wherein said sensor comprises an optical sensor.

8. A mail slot data cartridge exchange system for a data storage system, comprising:
   a drawer mounted to the data storage system so that said drawer can be moved between a retracted position and an extended position, said drawer being sized to hold at least one data cartridge;
   a drawer stop index member operatively associated with said drawer so that movement of said drawer stop index member corresponds to movement of said drawer; and lock apparatus mounted to said data storage system, said lock apparatus being switchable between a locked state and an unlocked state, said lock apparatus engaging said drawer stop index member when said lock apparatus is in the locked state and when said drawer is in a regulated extended position, said regulated extended position corresponding to a position of said drawer stop index member.

9. The mail slot data cartridge exchange system of claim 8, further comprising a cartridge magazine for holding at least one data cartridge, said cartridge magazine being sized to be removably received by said drawer, at least a portion of said cartridge magazine being exposed when said drawer is in the extended position to allow a system operator to access said cartridge magazine when said drawer is in the extended position.

10. The mail slot data cartridge exchange system of claim 8, wherein said drawer stop index number is mounted to said drawer.

11. The mail slot data cartridge exchange system of claim 8, further comprising a lock actuator operatively associated with said lock apparatus for moving said lock apparatus between the locked state and the unlocked state.

12. The mail slot data cartridge exchange system of claim 11, further comprising a drawer position sensing apparatus for sensing a position of said drawer and for producing a drawer position signal related thereto, said drawer position signal being used to control said lock actuator.

13. The mail slot data cartridge exchange system of claim 12, wherein said drawer position sensing apparatus comprises:
an index flag operatively associated with said drawer so that movement of said index flag corresponds to movement of said drawer; and
a sensor mounted to said data storage apparatus, said sensor being responsive to said index flag.

14. The mail slot data cartridge exchange system of claim 13, wherein said index flag is mounted to said drawer.

15. The mail slot data cartridge exchange system of claim 14, wherein said sensor comprises an optical sensor.

16. A mail slot data cartridge exchange system for a data storage system, comprising:
drawer means mounted to the data storage system so that said drawer means can be moved between a retracted position and an extended position;
cartridge magazine means for holding at least one data cartridge, said cartridge magazine means being sized to be removably received by said drawer means, at least a portion of said cartridge magazine means being exposed when said drawer means is in the extended position to allow a system operator to access said cartridge magazine means when said drawer means in the extend position;
drawer stop index member means operatively associated with said drawer means so that movement of said drawer stop index member means corresponds to movement of said drawer means; and
lock means mounted to said data storage system for engaging said drawer stop index member means when said lock means is in a locked state and when said drawer means is in a regulated extended position, said regulated extended position corresponding to a position of said drawer stop index member means.

17. Drawer extension regulator apparatus for regulating a location of an extended position of a drawer mounted to a chassis, comprising:

a plurality of drawer stop index members operatively associated with the drawer so that said plurality of drawer stop index members move with the drawer as the drawer is extended from the chassis, each of said plurality of drawer stop index members corresponding to a discrete drawer extension position;
a lock member mounted to the chassis, said lock member being moveable between a locked position and an unlocked position, said lock member engaging at least one of said plurality of drawer stop index members when said lock member is in the locked position;
an actuator operatively associated with said lock member, said actuator moving said lock member between the locked position and the unlocked position; and
a drawer position sensor operatively associated with the drawer and said actuator, said drawer position sensor sensing a position of the drawer with respect to the chassis.

18. The drawer extension regulator apparatus of claim 17, wherein each of said plurality of drawer stop index members is mounted to the drawer.

19. The drawer extension regulator apparatus of claim 17, further comprising a biasing device operatively associated with said lock member, said biasing device biasing said lock member in the unlocked position.

20. The drawer extension regulator apparatus of claim 19, wherein each of said plurality of drawer stop index members includes a lock face and a cam face and wherein said lock member includes a pawl, the lock face of each of said plurality of drawer stop index members engaging the pawl of said lock member when said lock member is in the engaged position to prevent the drawer from being further extended, the cam face of each of said plurality of drawer stop index members displacing said lock member from the locked position to the unlocked position as the drawer is returned to a retracted position.

21. The drawer extension regulator apparatus of claim 17, wherein said lock member is pivotally mounted to the chassis.

22. The drawer extension regulator apparatus of claim 17, wherein said actuator comprises a linear actuator.

23. The drawer extension regulator apparatus of claim 17, wherein said drawer position sensor comprises:
a plurality of flags operatively associated with the drawer so that said plurality of flags move with the drawer, each of said plurality of flags corresponding to a unique one of the discrete drawer extension positions; and
a sensor mounted to the chassis, said sensor detecting the presence or absence of said plurality of flags at the location of said sensor.

24. A mail slot data cartridge exchange system for a data storage system, comprising:
a drawer mounted to the data storage system so that said drawer can be moved between a retracted position and a plurality of extended positions;
a plurality of drawer stop index members mounted to said drawer, each of said plurality of drawer stop index members corresponding to a discrete drawer extension position of the plurality of extended positions;
a lock member mounted to the data storage system, said lock member being moveable between a locked position and an unlocked position, so that when said lock member is in the locked position, said lock member engages at least one of said plurality of drawer stop index members to prevent said drawer from being further extended while at the same time allowing said drawer to be moved to the retracted position;

an actuator operatively associated with said lock member, said actuator moving said lock member between the locked position and the unlocked position; and a drawer position sensor operatively associated with the drawer and said actuator, said drawer position sensor sensing a position of the drawer with respect to the retracted position.

25. The mail slot data cartridge exchange system of claim 24, further comprising a biasing device operatively associated with said lock member, said biasing device biasing said lock member in the unlocked position.

26. The mail slot data cartridge exchange system of claim 25, wherein each of said plurality of drawer stop index members includes a lock face and a cam face and wherein said lock member includes a pawl, the lock face of each of said plurality of drawer stop index members engaging the pawl of said lock member when said lock member is in the engaged position to prevent the drawer from being further extended, the cam face of each of said plurality of drawer stop index members displacing said lock member from the locked position to the unlocked position as the drawer is returned to the retracted position.

27. The mail slot data cartridge exchange system of claim 26, wherein said drawer position sensor comprises:

a plurality of flags operatively associated with the drawer so that said plurality of flags move with the drawer, each of said plurality of flags corresponding to a unique one of the discrete drawer extension positions; and a sensor mounted to the data storage system, said sensor detecting the presence or absence of said plurality of flags at the location of said sensor.

28. A mail slot data cartridge exchange system for a data storage system, comprising:

a drawer mounted to the data storage system so that said drawer can be moved between a retracted position and a plurality of extended positions; and drawer extension regulator means operatively associated with said drawer for allowing said drawer to be manually extended to a selected one of said plurality of extended positions and no further, while allowing said drawer to be manually returned to the retracted position without requiring additional actuation of said drawer extension regulator means.

29. A method for accessing at least one data cartridge contained in a data storage system, comprising:

providing the data storage system with a drawer sized to receive at least one data cartridge, the drawer being moveable between a retracted position and a plurality of extended positions;

providing the drawer with a drawer extension regulator apparatus, the drawer extension regulator apparatus allowing the drawer to be extended to a selected one of the plurality of extended positions;

extending the drawer from the retracted position;

actuating the drawer extension regulator apparatus to stop the extension of the drawer when the drawer has been extended to a selected one of the plurality of extended positions; and returning the drawer to the retracted position without further actuating the drawer extension regulator apparatus.

* * * * *